(12) United States Patent
Saito et al.

(10) Patent No.: US 9,955,092 B2
(45) Date of Patent: Apr. 24, 2018

(54) IMAGE SENSOR AND IMAGE CAPTURE APPARATUS USING THE SAME WITH MEMORY HOLDING PIXEL SIGNAL

(71) Applicant: CANON KABUSHIKI KAISHA, Tokyo (JP)

(72) Inventors: Makiko Saito, Tokyo (JP); Nobuhiro Takeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/287,005

(22) Filed: Oct. 6, 2016

(65) Prior Publication Data
US 2017/0111599 A1 Apr. 20, 2017

(30) Foreign Application Priority Data
Oct. 14, 2015 (JP) ................. 2015-202913

(51) Int. Cl.
*H04N 3/14* (2006.01)
*H04N 5/335* (2011.01)
*H04N 5/357* (2011.01)
*H04N 5/369* (2011.01)
*H04N 5/378* (2011.01)

(52) U.S. Cl.
CPC ........... *H04N 5/357* (2013.01); *H04N 5/3696* (2013.01); *H04N 5/378* (2013.01)

(58) Field of Classification Search
None
See application file for complete search history.

(56) References Cited

U.S. PATENT DOCUMENTS

| 5,995,141 | A | * | 11/1999 | Hieda | ............ | H04N 5/232 348/208.6 |
|---|---|---|---|---|---|---|
| 8,570,415 | B2 | | 10/2013 | Takeda | | |
| 8,582,009 | B2 | | 11/2013 | Kono et al. | | |
| 8,618,461 | B2 | | 12/2013 | Doi | | |
| 8,692,917 | B2 | | 4/2014 | Takeda | | |
| 9,030,589 | B2 | | 5/2015 | Sasaki et al. | | |
| 9,294,744 | B2 | | 3/2016 | Takeda | | |
| 2008/0246867 | A1 | * | 10/2008 | Sugai | ............ | H04N 3/155 348/302 |
| 2015/0358571 | A1 | * | 12/2015 | Dominguez Castro | ............ | H04N 5/345 348/308 |

FOREIGN PATENT DOCUMENTS

JP 2012-060334 A 3/2012

* cited by examiner

*Primary Examiner* — Stephen Coleman
(74) *Attorney, Agent, or Firm* — Fitzpatrick, Cella, Harper & Scinto

(57) ABSTRACT

Disclosed is an image sensor in which a redundant member is appropriately provided, and an image capture apparatus using this image sensor. The image sensor has a memory that performs A/D conversion on a read pixel signal and holds this signal. The memory includes a first memory unit for holding a first pixel signal in pixel signals, and a second memory unit for holding a second pixel signal. Larger redundant storage capacity is provided in the first memory than in the second memory.

22 Claims, 7 Drawing Sheets

FIG. 3A
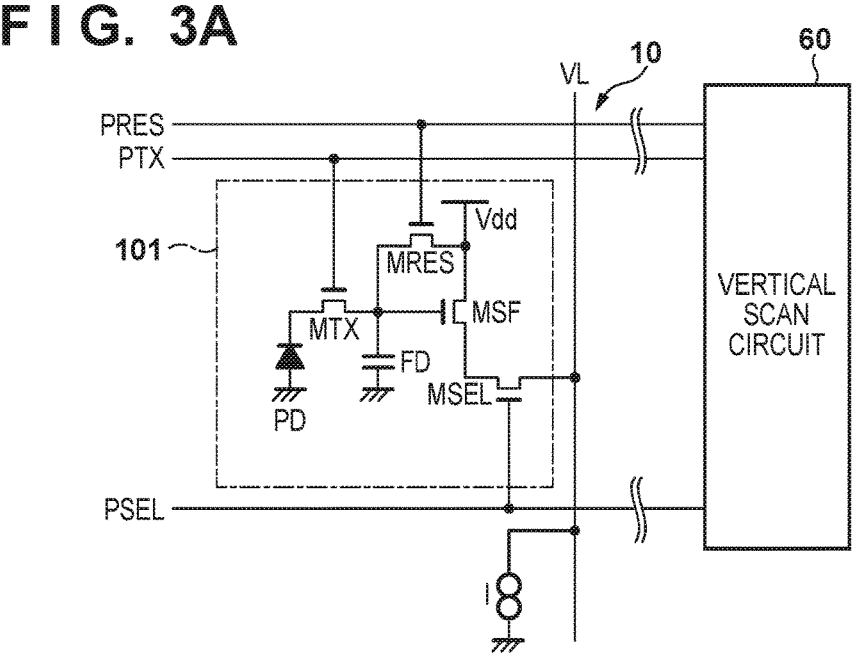
FIG. 3B
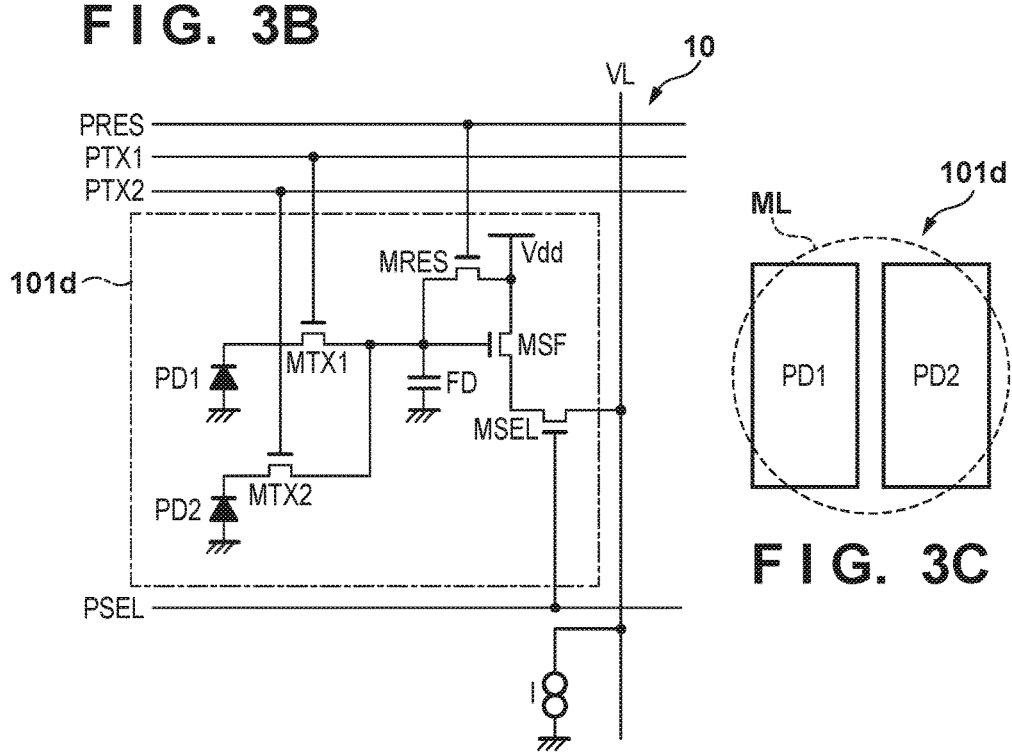
FIG. 3C

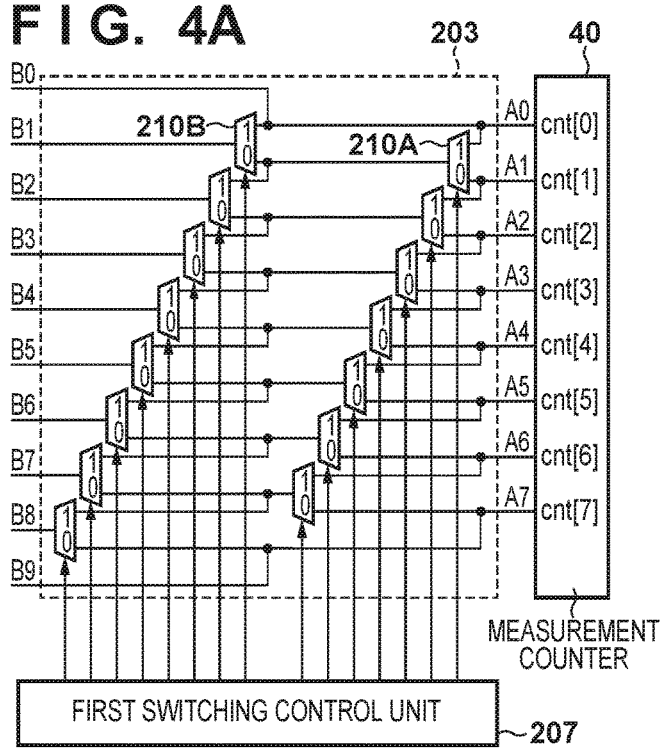
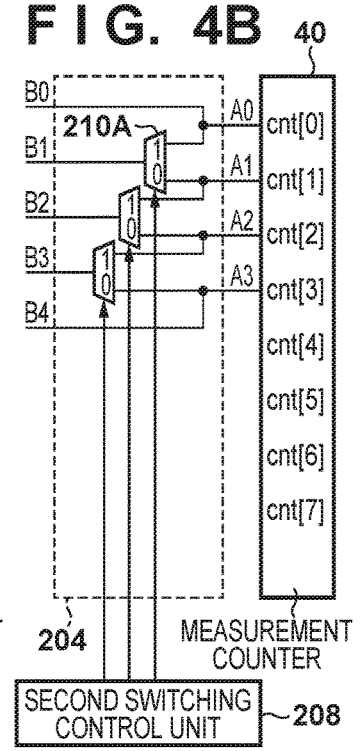
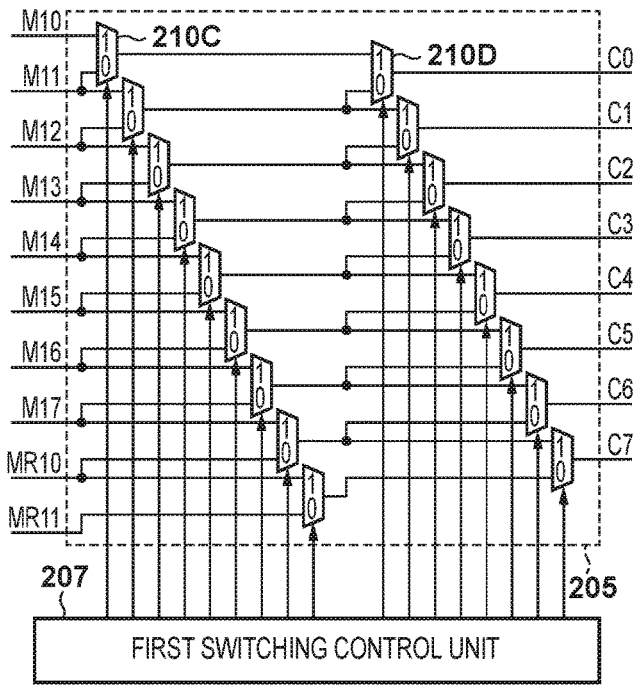
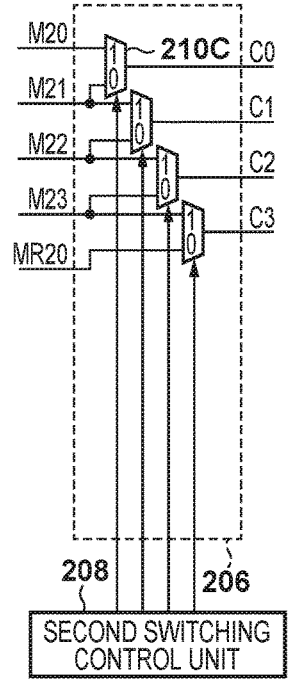

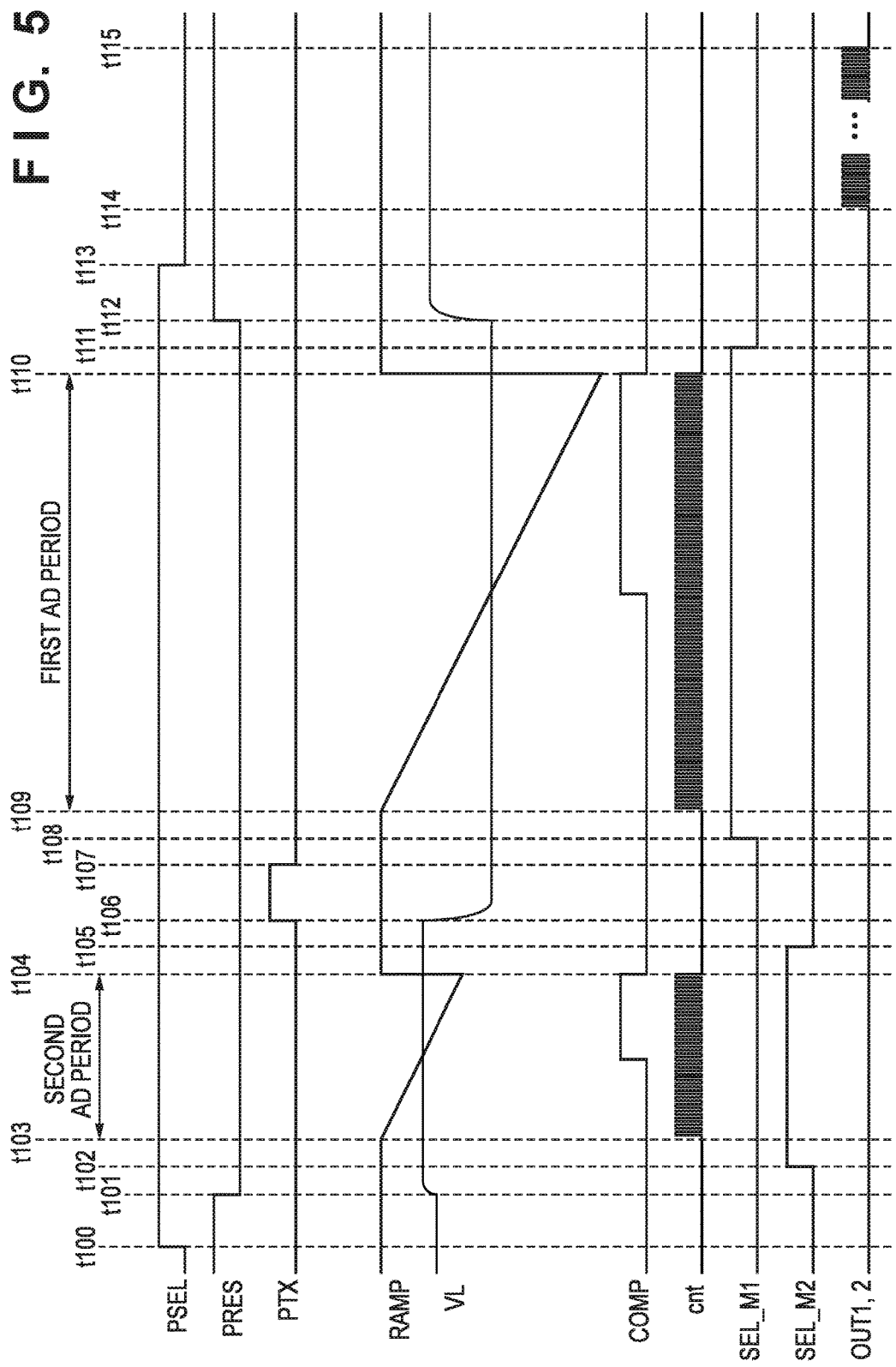

IMAGE SENSOR AND IMAGE CAPTURE APPARATUS USING THE SAME WITH MEMORY HOLDING PIXEL SIGNAL

BACKGROUND OF THE INVENTION

Field of the Invention

The present invention relates to image sensors and image capture apparatuses using image sensors.

Description of the Related Art

Recently, the size of electronic devices having an imaging function, such as digital cameras and mobile phones, has been reduced, and simultaneously, the number of pixels in an image sensor has been increased, which leads to a tendency to an increase in the circuit density within an image sensor.

However, if the circuit density increases, a problem arises in that failures are more likely to occur. For example, assuming a failure in a plurality of holding circuits embedded in an image sensor, Japanese Patent Laid-Open No. 2012-60334 discloses a configuration in which a redundant holding circuit and a 1-bit storage cell are provided.

According to Japanese Patent Laid-Open No. 2012-60334, even if a failure occurs, a function of the image sensor can be maintained by using the redundant holding circuit and the 1-bit storage cell in place of a holding circuit and a 1-bit storage cell that have failed. Provision of more redundant members enables more failures to be dealt with, but the circuit scale increases, and a necessary mounting area also increases. If the density is further increased in order not to increase the mounting area, failures will be more likely to occur. Accordingly, it is necessary to appropriately provide a redundant circuit with which an increase in the circuit scale due to unnecessary redundancy is prevented while sufficient fault-tolerance is maintained, but this point is not considered in Japanese Patent Laid-Open No. 2012-60334.

SUMMARY OF THE INVENTION

The present invention has been made in view of the foregoing problem in the conventional technique, and an aspect of the present invention provides an image sensor that is appropriately provided with a redundant member.

According to one aspect of the present invention, there is provided an image sensor having a plurality of pixels and capable of reading out pixel signals having different largest values, comprising: an A/D convertor that performs A/D conversion on a read pixel signal; and a memory that holds a pixel signal obtained by performing the A/D conversion, wherein the memory includes a first memory for holding a first pixel signal of the pixel signals, and a second memory for holding a second pixel signal of the pixel signals, and wherein redundant storage capacity of the first memory is larger than redundant storage capacity of the second memory.

According to another aspect of the present invention, there is provided an image capture apparatus comprising: an image sensor having a plurality of pixels and capable of reading out pixel signals having different largest values, the image sensor including: an A/D convertor that performs A/D conversion on a read pixel signal; and a memory that holds a pixel signal obtained by performing the A/D conversion, wherein the memory includes a first memory for holding a first pixel signal of the pixel signals, and a second memory for holding a second pixel signal of the pixel signals, and wherein redundant storage capacity of the first memory is larger than redundant storage capacity of the second memory; and an image processing unit adapted to perform image processing using the first pixel signal that is read out from the first memory and the second pixel signal that is read out from the second memory.

Further features of the present invention will become apparent from the following description of exemplary embodiments with reference to the attached drawings.

BRIEF DESCRIPTION OF THE DRAWINGS

FIGS. 3A to 3C are equivalent circuit diagrams showing an exemplary configuration of a pixel provided in the image sensor according to an embodiment.

FIGS. 4A to 4D are diagrams showing exemplary circuit configurations of first to fourth bit switching units and other members according to an embodiment.

FIG. 5 is a timing chart showing an exemplary signal readout operation according to a first embodiment.

DESCRIPTION OF THE EMBODIMENTS

Exemplary embodiments of the present invention will now be described in detail in accordance with the accompanying drawings.

First Embodiment

Overall Configuration

Figure 2:
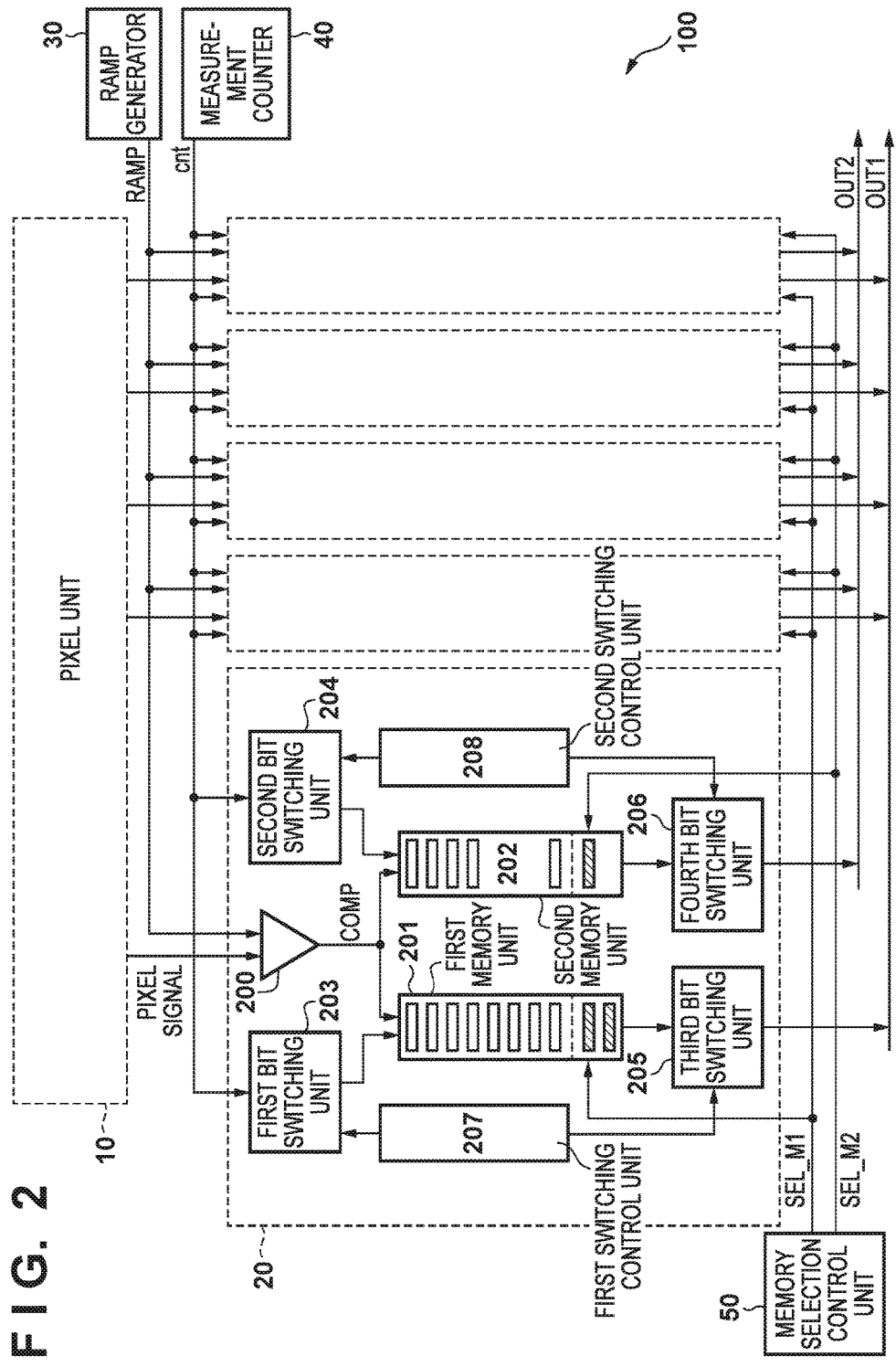
FIG. 2 is a block diagram schematically showing an exemplary overall configuration of an image sensor according to an embodiment.

FIG. 2 is a block diagram schematically showing an exemplary overall configuration of an image sensor 100 according to an embodiment of the present invention. The image sensor 100 has a pixel unit 10, a plurality of column circuits 20, a ramp generator 30, a measurement counter 40, and a memory selection control unit 50.

In the pixel unit 10, a plurality of pixels are arranged in a matrix, for example. A pixel configuration will be described later. The ramp generator 30 outputs a reference signal RAMP, which is a slope signal having a value proportional to an elapsed time. The measurement counter 40 performs up-counting while the reference signal RAMP is output from the ramp generator 30. The memory selection control unit 50 outputs selection signals SEL_M1 and SEL_M2 for a plurality of circuits provided in each column circuit 20.

Configuration of Column Circuits

Next, a configuration of the column circuits 20 will be described. In this embodiment, the column circuits 20 are provided for respective column output lines in the pixel unit. The column circuits 20 each form, together with the ramp generator 30 and the measurement counter 40, a circuit that performs A/D conversion on a pixel signal.

The comparator 200 receives the reference signal RAMP of the ramp generator 30 and the pixel signal from the pixel unit 10, and outputs a signal COMP that corresponds to the result of comparison between these two signals. Here, the signal COMP is at the low level if the reference signal RAMP is larger than the pixel signal, and is at the high level if the reference signal RAMP falls below the pixel signal. Although the details will be described later, the comparator 200 functions as an A/D converter.

A count value of the measurement counter 40 and a switching control signal from a first switching control unit 207 are input to a first bit switching unit 203. The switching control signal assigns each bit of the count value to an output signal line such that each bit of the count value is written in a given bit memory in a plurality of bit memories provided in a first memory unit 201.

That is to say, the first bit switching unit 203 is a circuit for switching from N inputs to M outputs (M>N). The switching control signal output by the first switching control unit 207 controls an input/output relationship between the M-bit outputs, which corresponds to M bit memories provided in the first memory unit 201, and the N-bit input, which corresponds to the count value, and controls/selects the writing destination for the count value for each bit thereof.

The first memory unit 201 is a memory that holds a signal obtained by performing A/D conversion on the pixel signal in a state where the charge is accumulated. The first memory unit 201 has a plurality of bit memories, and receives the signal COMP output by the comparator 200, an output signal of the first bit switching unit 203, and a selection signal SEL_M1 output by the memory selection control unit 50. Data writing in the first memory unit 201 is enabled when the selection signal SEL_M1 is at the high level, and data writing in the first memory unit 201 is disabled when the selection signal SEL_M1 is at the low level. If the signal COMP turns to the high level from the low level in a state where the selection signal SEL_M1 is at the high level, the first memory unit 201 takes the output signal of the first bit switching unit 203 into the bit memories. The count value is thus held in the first memory unit 201.

A second memory unit 202 is a memory that holds a signal obtained by performing A/D conversion on the pixel signal in a state where the charge has been reset. The count value of the measurement counter 40 and a switching control signal from a second switching control unit 208 are input to a second bit switching unit 204. The switching control signal assigns each bit of the count value to an output signal line such that each bit of the count value is written in a given bit memory in a plurality of bit memories provided in the second memory unit 202.

The second bit switching unit 204 and the second switching control unit 208 achieve functions similar to those of the first bit switching unit 203 and the first switching control unit 207 except that the number of input/output bits is smaller than that of the first bit switching unit 203.

A third bit switching unit 205 selects the output of a given bit memory from among outputs of the bit memories in the first memory unit 201 and outputs the selected output in accordance with the switching control signal from the first switching control unit 207. Specifically, the third bit switching unit 205 is a circuit for switching from M inputs to N outputs (M>N). The switching control signal output by the first switching control unit 207 controls an input/output relationship between M-bit inputs, which correspond to M bit memories provided in the first memory unit 201, and N-bit outputs, and controls/selects the signal output from the first memory unit 201 for each bit thereof.

A fourth bit switching unit 206 and the second switching control unit 208 achieve functions similar to those of the third bit switching unit 205 and the first switching control unit 207 except that the number of input/output bits is smaller than that of the third bit switching unit 205.

Pixel Configuration

FIG. 3A is an equivalent circuit diagram of a pixel 101, which is arranged in the pixel unit 10 in the image sensor 100. In the pixel unit 10, a plurality of pixels 101, each having a configuration shown in FIG. 3A, are arranged two-dimensionally in a matrix, for example.

The pixels 101 are each constituted by a photodiode PD that performs photoelectric conversion, a floating diffusion FD that temporarily accumulates the charge, and a plurality of MOS transistors.

The photodiode PD is connected to the floating diffusion FD by a transfer transistor MTX. The transfer transistor MTX is controlled by a transfer pulse PTX that is generated by a vertical scanning circuit 60, and transfers, when in an ON state, the charge generated at the photodiode PD to the floating diffusion FD.

The floating diffusion FD is connected to a power supply interconnect via a reset transistor MRES. The reset transistor MRES is controlled by a reset pulse PRES generated by the vertical scanning circuit 60, and resets, when in an ON state, the floating diffusion FD to a power supply voltage Vdd.

The floating diffusion FD is also connected to a gate of an amplifier transistor MSF. The amplifier transistor MSF is connected to a column output line VL via a selection transistor MSEL, and forms a source follower amplifier together with a constant current source I. The amplifier transistor MSF outputs a pixel signal corresponding to the voltage at the floating diffusion FD to the column output line VL via the selection transistor MSEL. The column output line VL is connected to the column circuit 20. The selection transistor MSEL is controlled by a selection pulse PSEL generated by the vertical scanning circuit 60.

Note that, in the following description, a pixel signal that corresponds to noise components and is output in a state where the charge accumulated in the floating diffusion FD has been reset will be called a basis signal, and a digital signal obtained by performing A/D conversion on the basis signal will be called an N signal. A pixel signal that is output in a state where the charge has been transferred from the photodiode PD to the floating diffusion FD and the charge generated by exposure is accumulated will be called an imaging signal, and a digital signal obtained by performing A/D conversion on the imaging signal will be called an S signal. The levels of the imaging signal and the S signal change depending on the quantity of received light of the photodiode PD (i.e. the amount of generated charge). Meanwhile, the levels of the basis signal and the N signal do not depend on the quantity of received light. Accordingly, the range of the basis signal is narrower than the range of the imaging signal, and the largest value of the N signal is smaller than the largest value of the S signal.

Configuration of Memory Unit

Next, a configuration of the first memory unit 201 and the second memory unit 202 will be described with reference to FIGS. 1A and 1B.

In this embodiment, the number of redundant bit memories provided in the first memory unit 201 and the second memory unit 202 are determined in accordance with the largest value of the signals held in the first memory unit 201 and the second memory unit 202, or more specifically, the number of necessary bits for holding the largest value. The storage capacity (i.e. the number of bit memories) of the first memory unit 201 and the second memory unit 202 can also be determined in accordance with the number of necessary bits for holding the largest value of the signals.

The larger the number of necessary bits for holding the largest value of a signal is, the larger the number of bit memories to be actually used is, and therefore, a failure of a bit memory has more influence. Accordingly, the larger the number of necessary bits for holding the largest value of a signal is, the larger the number of redundant bit memories is. In the case where the number of necessary bits for holding the largest value of a signal is small, even if a failure occurs in a bit memory that is not used from the beginning, it does not have any influence, and therefore, the number of redundant bit memories may also be small.

In the case of fixing the number of redundant bit memories regardless of the number of necessary bits for holding the largest value of a signal, the redundant bit memories are more likely to be insufficient in the memory unit that is used for holding a signal whose largest value is large. If the redundant bit memories are insufficient, the entire image sensor cannot be used anymore.

In the case where the number of necessary bits for holding the largest value of a signal is small and some bit memories are not used, the mounting area thereof is a waste. Accordingly, in this embodiment, if the number of necessary bits for holding the largest value of a signal is small, not only the number of redundant bit memories but also the capacity itself are reduced.

Figure 1A:
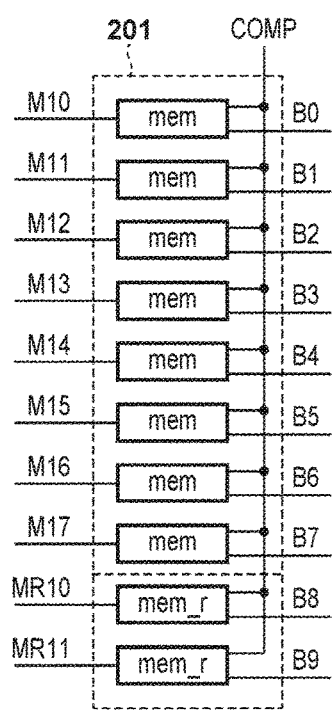
FIGS. 1A and 1B are block diagrams showing a configuration of a first memory unit and a second memory unit according to a first embodiment.
Figure 1B:
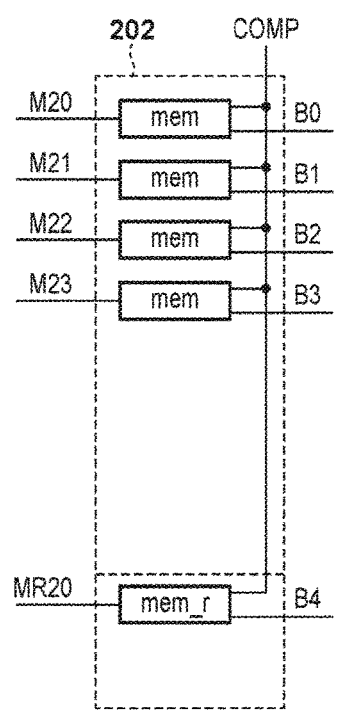

FIG. 1A is a block diagram schematically showing a configuration of the first memory unit 201, and FIG. 1B is a block diagram schematically showing a configuration of the second memory unit 202.

A plurality of bit memories mem and mem_r are provided in the first memory unit 201 and the second memory unit 202. mem denotes a bit memory to be usually used (i.e. that is not spare), and mem_r denotes a redundant bit memory (spare memory) to be used in place of a bit memory mem that has failed. In the following description regarding the first memory unit 201 and the second memory unit 202, the bit memory mem that is usually used (i.e. not spare) will be referred to as a "regular bit memory" for the sake of convenience. A bit memory is simply called a "bit memory" without "redundant" or "regular" in the case of not distinguishing between the regular bit memory and the redundant bit memory.

The largest value of the N signal is smaller than the largest value of the S signal, and therefore, the number of regular bit memories mem provided in the second memory unit 202 for holding the N signal is set smaller than the number of regular bit memories mem provided in the first memory unit 201. Also, if the failure rate of the bit memories is fixed, the larger the number of bit memories is, the higher the probability that a failure occurs in any of the bit memories is. For this reason, in the first memory unit 201 in which the number of the regular bit memories mem is larger than in the second memory unit 202, more redundant bit memories mem_r are provided than in the second memory unit 202. That is to say, the redundant storage capacity in the first memory unit 201 is set to be larger than the redundant storage capacity in the second memory unit 202.

Note that FIGS. 1A and 1B show an example in which eight regular bit memories mem for the S signal and four regular bit memories mem for the N signal are provided, as an exemplary configuration in the case where the largest value of the S signal is expressed by eight bits and the largest value of the N signal is expressed by four bits. Also, in this example, the number of redundant bit memories is set such that the ratio between the number of redundant bit memories (2) for the S signal and the number of redundant bit memories (1) for the N signal is equal to the ratio between the regular bit memories (8) for the S signal and the number of regular bit memories (4) for the N signal.

However, this is merely an example, and a larger number of regular bit memories mem than the number of bits that expresses the largest value of a signal to be held may be provided. Furthermore, as long as the number of redundant bit memories is set larger in the memory unit that includes a larger number of regular bit memories, configuration may be such that the ratio of the number of redundant bit memories is not equal to the ratio of the number of regular bit memories.

The signal COMP from the comparator 200 and one of output signals B0 to B9 of the first bit switching unit 203 are input to each bit memory in the first memory unit 201. Outputs M10 to M17 are output from the regular bit memories, and outputs MR10 and MR11 are output from the redundant bit memories.

The signal COMP from the comparator 200 and one of output signals B0 to B4 of the second bit switching unit 204 are input to each bit memory in the second memory unit 202. Outputs M20 to M23 are output from the regular bit memories, and an output MR20 is output from the redundant bit memory.

Bit Switching Unit

FIGS. 4A to 4D are diagrams showing an exemplary circuit configuration of the first to fourth bit switching units 203 to 206 and exemplary connection to the measurement counter 40 and the first and second switching control units 207 and 208.

The first to fourth bit switching units 203 to 206 are each constituted by a combination of a plurality of selectors 210. If the control signal input from the switching control unit 207 or 208 is 0 or at the low level, each selector 210 selects and outputs the signal that is input to a terminal 0, and if the control signal is 1 or at the high level, each selector 210 selects and outputs a signal that is input to a terminal 1.

FIG. 4A shows a circuit configuration of the first bit switching unit 203. In the first bit switching unit 203, a plurality of selectors 210A and a plurality of selectors 210B are arranged in a two-stage configuration. The plurality of selectors 210A and 210B assign N-bit (here, N=8) signals A0 to A7, which are output by the measurement counter 40, to N bits of M-bit (here, M=10) outputs B0 to B9, based on the control signal from the first switching control unit 207. Thus, the selectors 210A and 210B enable N bit memories that have not failed out of M bit memories provided in the first memory unit 201 to be selected to hold the count value.

Note that, the signals B0 and B9 in the signals B0 to B9 are always assigned the most significant bit (A7) and the least significant bit (A0), respectively, of the count value. An input/output relationship between the remaining signals B1 to B8 and the signals A0 to A7 is controlled by the selectors 210A and 210B.

The number of output bits of the first bit switching unit 203 is equal to the number of bit memories provided in the first memory unit 201 that is connected thereto. Accordingly, the bit memory in which each bit of the count value is written can be controlled or selected by controlling the signals selected by the selectors 210A and 210B using the switching control signal output by the first switching control unit 207.

The output signals B0 to B7 are input to respective bits of the memories mem in the first memory unit 201, and the output signals B8 and B9 are input to respective bits of the redundant memories mem_r in the first memory unit 201. The signals B0 to B9 in FIG. 4A correspond to the signals B0 to B9 in FIG. 1A.

FIG. 4B shows a circuit configuration of the second bit switching unit 204. The control signal from the second switching control unit 208 is input to the selectors 210A, which assign O-bit (here, O=4) signals A0 to A3, which are output by the measurement counter 40, to O bits of P-bit (here, P=5) outputs B0 to B4.

FIG. 4C shows a circuit configuration of the third bit switching unit 205. The third bit switching unit 205 performs an operation that is the reverse of that of the first bit switching unit 203, and outputs N-bit outputs from M-bit inputs (M>N). Specifically, the third bit switching unit 205 has (M−1) selectors 210C, to each of which two adjacent values of M bit memories provided in the first memory unit 201 are input, and N selectors 210D, to each of which two adjacent outputs of the selectors 210C are input. The individual selectors are controlled by the control signal from the first switching control unit 207 and, of the output signals of M bit memories provided in the first memory unit 201, signals from N bit memories that have not failed are selected and output as signals C0 to C7. Thus, the third bit switching unit 205 outputs the count value held in the first memory unit 201. Note that the signals M10 to M17, MR10, and MR11 in FIG. 4C correspond to the signals with the same name in FIG. 1A.

FIG. 4D shows a circuit configuration of the fourth bit switching unit 206. The fourth bit switching unit 206 performs a reverse operation with respect to the first bit switching unit 203, and outputs O-bit outputs (P>O) from P bit inputs. The fourth bit switching unit 206 has (P−1) selectors 210C, to each of which two adjacent values of P bit memories provided in the second memory unit 202 are input. The control signal from the second switching control unit 208 is input to the selectors 210C, which select signals from bit memories that have not failed from among the signals M20 to M23 and MR20 from the second memory unit 202 to output the selected signals as signals C0 to C3. Thus, the fourth bit switching unit 206 outputs the count value held in the second memory unit 202. Note that the signals M20 to M23 and MR20 in FIG. 4D correspond to the signals with the same name in FIG. 1B.

Note that the example in FIGS. 4A to 4D has described a configuration of the bit switching units in which the input signal is assigned to the signal whose number of bits is larger by the number of redundant bit memories by performing bit-shifting using the selectors 210. Thus, even if there is a regular bit memory that has failed, the relationship between the arrangement of the bit memories used for holding the count value and the order from the most significant bit to the least significant bit of the count value (or the reverse order) can be maintained. However, other configurations may also be employed, such as constituting the bit switching units with matrix switches and further providing a matrix switch that restores the bit order of signals read out from the memory units.

A nonvolatile storage circuit (e.g. an electronic fuse or a nonvolatile memory) is provided in the image sensor 100, and failure information regarding the bit memories in the first memory unit 201 and the second memory unit 202 is stored therein. The first switching control unit 207 and the second switching control unit 208 generate a control signal for holding a signal using bit memories that have not failed, based on the failure information. Note that a configuration may be employed in which, if no failure has occurred in the regular bit memories mem, signals are not read from or written in the redundant bit memories to suppress the occurrence of a failure in the redundant bit memories. In this case, a configuration may also be employed in which a selector to which the output signal B9 is input is further provided in the first bit switching unit 203 shown in FIG. 1A, and the selectors are controlled so as to not output the signals B8 and B9 in the case of not using the redundant bit memories.

Signal Readout Operation

FIG. 5 is a timing chart showing an exemplary signal readout operation of the image sensor 100 according to this embodiment. In FIG. 5, the selection pulse PSEL, the reset pulse PRES, and the transfer pulse PTX for the pixels are generated by the vertical scanning circuit 60. The selection signals SEL_M1 and SEL_M2 are generated by the memory selection control unit 50, and the reference signal RAMP is generated by the ramp generator 30. Note that a clock signal for generating the control pulse and for the measurement counter 40 performing counting may be supplied from the outside of the imaging sensor 100, or may be generated by a timing generator in the imaging sensor 100 based on a reference clock that is supplied from the outside of the imaging sensor 100.

At timing t100, the vertical scanning circuit 60 sets the selection pulse PSEL for the pixel 101 from which a signal is to be read out to the high level, turns on the selection transistor MSEL, and connects the pixel 101 to the column output line VL.

At time t101, the vertical scanning circuit 60 sets the reset pulse PRES to the low level, turns off the reset transistor MRES in the pixel 101, and ends the reset of the floating diffusion FD. The pixel signal at this time (the signal of the column output line VL) is input as the basis signal to the comparator 200.

At time t102, the memory selection control unit 50 sets the selection signal SEL_M2 to the high level and enables writing of the signal in the second memory unit 202.

At time t103, the ramp generator 30 starts to input the reference signal RAMP to the comparator 200. Also, the measurement counter 40 starts up-counting from an initial value.

During a period from the time t103 to time t104, the comparator 200 continuously compares the basis signal with the reference signal RAMP, and if the reference signal RAMP falls below the basis signal, the comparator 200 inverts the signal COMP indicating the comparison result from the low level to the high level. A count value cnt of the measurement counter 40 at the time point when the signal COMP is inverted from the low level to the high level is held as the N signal obtained by performing A/D conversion on the basis signal, in the second memory unit 202. At this time, the second switching control unit 208 generates a control signal such that bit memories that have not failed in the second memory unit 202 hold the N signal.

At the time t104, the ramp generator 30 ends the input of the reference signal RAMP to the comparator 200.

At time t105, the memory selection control unit 50 sets the selection signal SEL_M2 to the low level and disables the writing of the signal in the second memory unit 202.

At time t106, the vertical scanning circuit 60 sets, to the high level, the transfer pulse PTX for the pixel 101 from which the signal is read out, turns on the transfer transistor MTX, and the charge accumulated in the photodiode PD is transferred to the floating diffusion FD.

At time t107, the vertical scanning circuit 60 sets the transfer pulse PTX to the low level, turns off the transfer transistor MTX, and ends the charge transfer from the photodiode PD to the floating diffusion FD. The pixel signal at this time (the signal of the column output line VL) is input as an imaging signal to the comparator 200.

At time t108, the memory selection control unit 50 sets the selection signal SEL_M1 to the high level and enables writing of the signal in the first memory unit 201.

At time t109, the ramp generator 30 starts to input the reference signal RAMP to the comparator 200. Also, the measurement counter 40 starts up-counting from an initial value.

During a period from the time t109 to time t110, the comparator 200 continuously compares the imaging signal with the reference signal RAMP, and if the reference signal RAMP falls below the imaging signal, the comparator 200 inverts the signal COMP indicating the comparison result from the low level to the high level. The count value cnt of the measurement counter 40 at the time point when the signal COMP is inverted from the low level to the high level is held as the S signal obtained by performing A/D conversion on the imaging signal, in the first memory unit 201. At this time, the first switching control unit 207 generates a control signal such that bit memories that have not failed in the first memory unit 201 hold the S signal.

At time t110, the ramp generator 30 ends the input of the reference signal RAMP to the comparator 200.

At time t111, the memory selection control unit 50 sets the selection signal SEL_M1 to the low level and disables the writing of the signal in the first memory unit 201.

At time t112, the vertical scanning circuit 60 sets the reset pulse PRES to the high level, and turns on the reset transistor MRES to start to reset the floating diffusion FD.

At time t113, the vertical scanning circuit 60 sets the selection pulse PSEL to the low level, turns off the selection transistor MSEL, and cancels the connection of the pixel 101 to the column output line VL.

Lastly, during a period from time t114 to time t115, the S signal held in the first memory unit 201 and the N signal held in the second memory unit 202 are output respectively from output circuits OUT1 and OUT2. At this time, the first switching control unit 207 and the second switching control unit 208 generate control signals for outputting signals of bit memories that hold the S signal and the N signal in the first memory unit 201 and the second memory unit 202.

Thereafter, an imaging signal with reduced noise components can be obtained by obtaining a difference between the S signal and the N signal, for example.

The image sensor according to this embodiment has a circuit that performs A/D conversion on a pixel signal, a second memory that holds a signal obtained by performing A/D conversion on the pixel signal in a state where the charge has been reset, and a first memory that holds a signal obtained by performing A/D conversion on the pixel signal in a state where the charge is accumulated. Furthermore, larger redundant storage capacity is provided in the first memory than in the second memory. Thus, the function of the first memory that is more likely to be affected by a failure than the second memory can be appropriately maintained. In addition, the mounting area for unnecessarily redundant memory capacity in the second memory can be reduced.

Furthermore, by providing larger storage capacity in the first memory than in the second memory, unnecessary memory capacity of the second memory can be reduced, and thus, the memory capacity will not be wasted and the mounting area of the memories can reduced, achieving a reduction in the size of the image sensor.

Modification

Next, a modification of this embodiment will be described with reference to FIG. 6. This modification is different in that the first to fourth bit switching units 203 to 206 are not provided for each column circuit 20 but are shared by the plurality of column circuits 20a. By sharing the first to fourth bit switching units 203 to 206, the mounting area or the circuit density of the column circuits 20a can be reduced, and it is possible to achieve cost-down, a reduction in the size of the image sensor, or suppressing of the occurrence of a failure.

Figure 6:
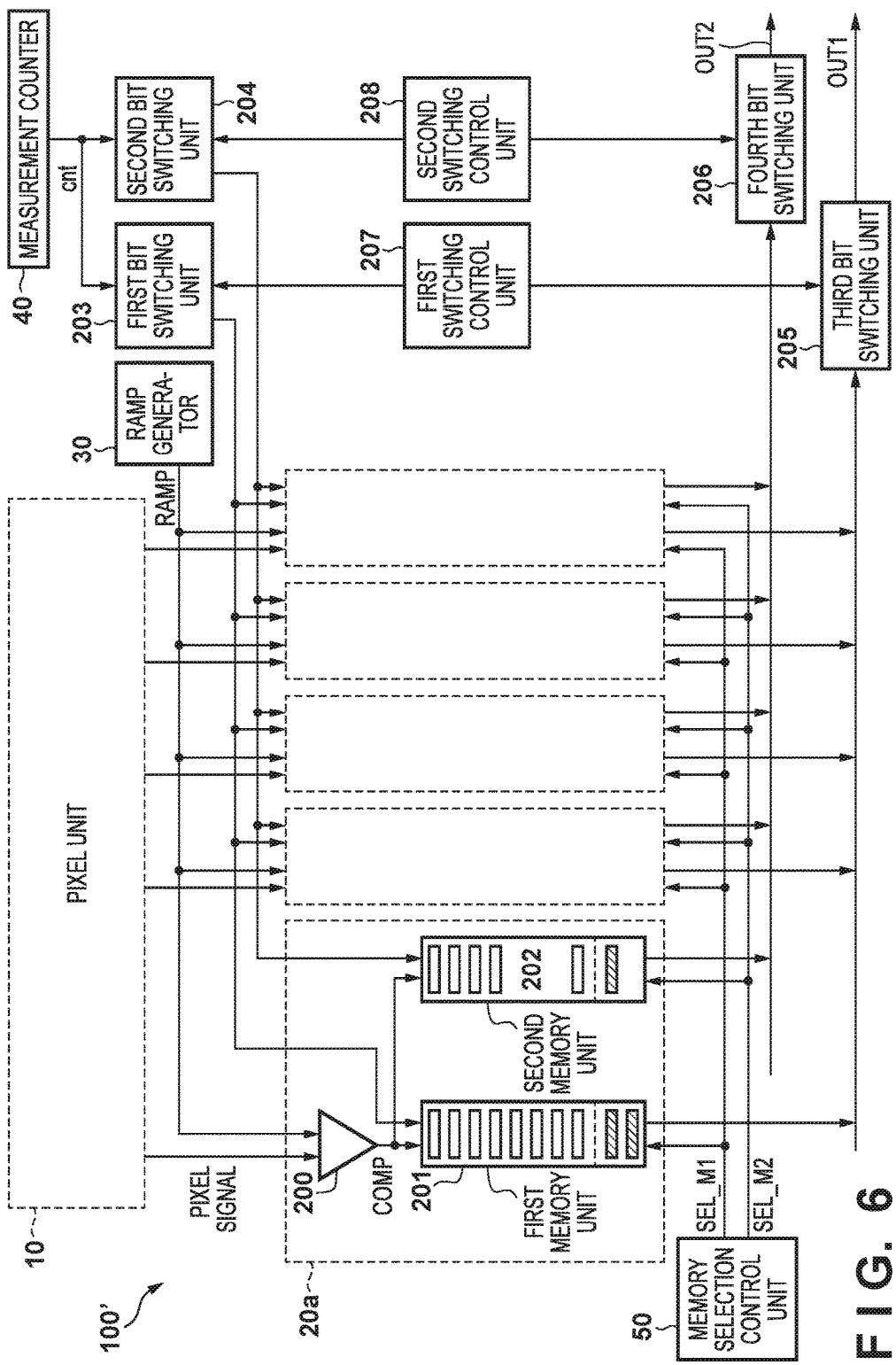
FIG. 6 is a block diagram schematically showing an exemplary overall configuration of an image sensor according to a modification of the first embodiment.

FIG. 6 is a block diagram schematically showing an exemplary overall configuration of an image sensor 100' according to this modification. In FIG. 6, the same constituent elements as those in FIG. 2 will be assigned the same reference numerals, and redundant description will be omitted. A configuration in this modification is similar to the configuration in FIG. 2 except that only one set of the first to fourth bit switching units 203 to 205 and the first and second switching control units 207 and 208 is provided independently of the column circuits 20a, and is shared by the plurality of column circuits 20a. The operation of the first to fourth bit switching units 203 to 205 and the first and second switching control units 207 and 208 may be similar to that in the configuration in FIG. 2, and accordingly, a description of the details of the operation will be omitted.

In this modification, the selection of the bit memories used for reading and writing pixel signals in the first memory unit 201 and the second memory unit 202 is common among all column circuits 20a, and therefore, the robustness to a failure in the bit memories is lower than in the configuration in FIG. 2. However, similar effects can be achieved with a significantly smaller circuit scale than in the configuration in FIG. 2.

Second Embodiment

Next, a second embodiment of the present invention will be described with reference to FIG. 7. This embodiment is different from the first embodiment in that, in the column circuits 20, a configuration relating to generation and holding of the N signal and a configuration relating to generation and holding of the S signal are separated, and the basis signal is obtained from a pixel in a specific region (basis pixel region) in the pixel unit 10.

Figure 7:
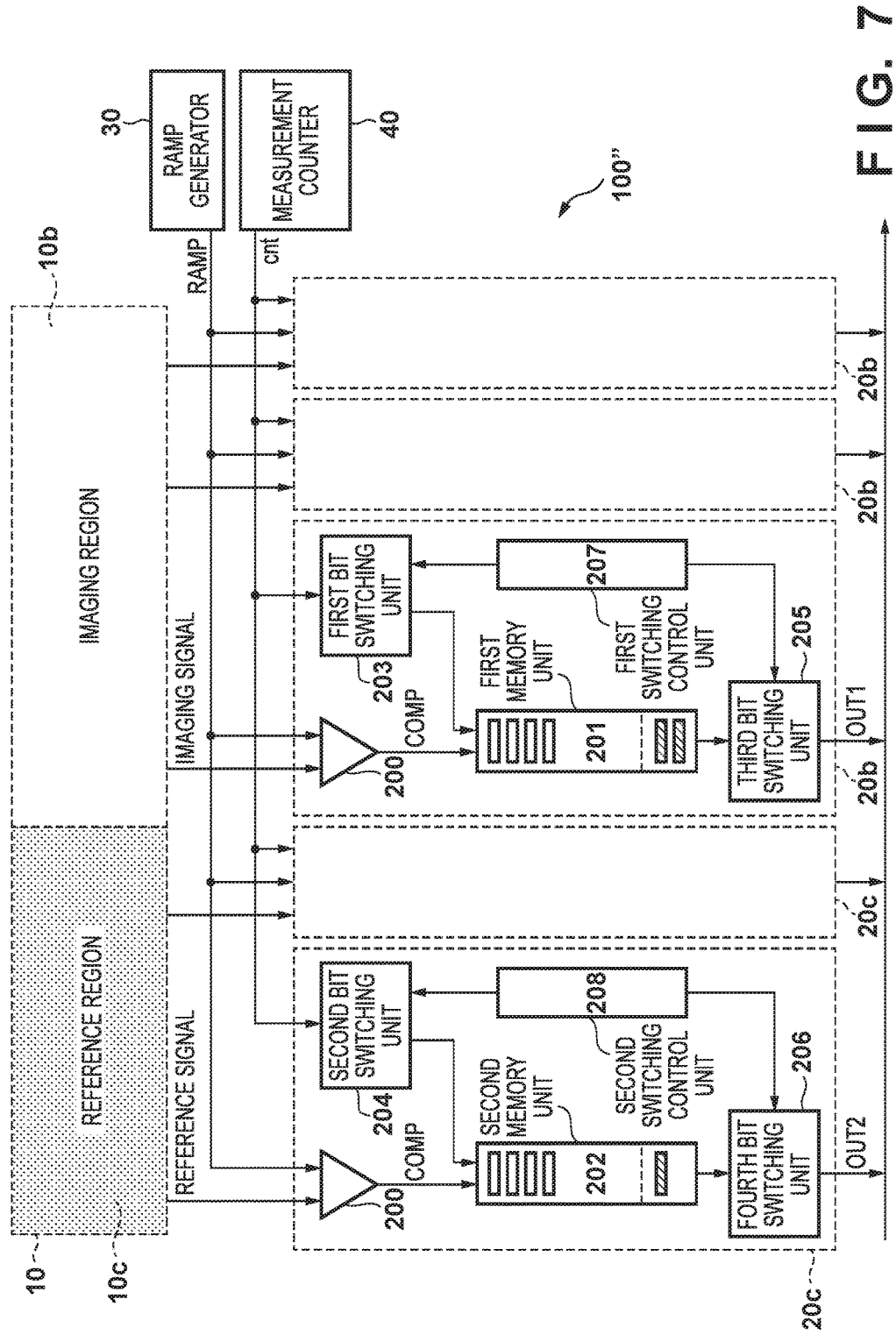
FIG. 7 is a block diagram schematically showing an exemplary overall configuration of an image sensor according to a second embodiment.

FIG. 7 is a block diagram schematically showing an exemplary overall configuration of an image sensor 100" according to this embodiment. In FIG. 7, the same constituent elements as those in FIG. 2 are assigned the same reference numerals, and redundant description will be omitted. The pixel unit 10 has an imaging region 10b and a basis region 10c, and pixels (e.g. pixels having a configuration similar to that of the pixels 101 described using FIG. 3A) are provided in these regions. Hereinafter, a pixel provided in the imaging region 10b will be called an imaging pixel, and a pixel provided in the basis region 10c will be called a basis pixel.

Although the imaging pixel and the basis pixel may have the same configuration, the imaging pixel is exposed, whereas the basis region 10c is light-shielded, and the photodiode PD in the basis pixel is not exposed. Alternatively, the basis pixel may have a configuration of the pixel 101 from which the photodiode PD is removed.

In a configuration according to this embodiment, the column circuits 20 according to the first embodiment are divided into column circuits 20b having a configuration relating to the S signal, and column circuits 20c having a configuration relating to the N signal.

The column circuits 20b are provided for respective column output lines in the imaging region 10b, and are each provided with the comparator 200, the first memory unit 201, the first bit switching unit 203, the third bit switching unit 205, and the first switching control unit 207.

The column circuits 20c are provided for respective column output lines in the basis region 10c, and are each provided with the comparator 200, the second memory unit 202, the second bit switching unit 204, the fourth bit switching unit 206, and the second switching control unit 208.

Unlike in the first embodiment, only one memory unit that holds the S signal or the N signal is provided in each of the column circuits 20b and 20c. For this reason, the memory selection control unit 50 for selecting a memory unit for the reading and writing is unnecessary.

Since the operation of each element in the column circuits 20b and 20c is similar to that in the configuration described in the first embodiment, a description thereof will be omitted.

This embodiment can achieve effects similar to those of the first embodiment except that a larger number of comparators 200 are provided than in the configuration according to the first embodiment, and the memory selection control unit 50 is unnecessary.

Third Embodiment

Next, a third embodiment of the present invention will be described with reference to FIGS. 3B and 3C. This embodiment is different from the above-described embodiments in that each pixel has a plurality of photoelectric conversion regions or photodiodes and, in the case of a configuration where a parallax image can be output, a focus detection signal is held, in place of the basis signal, in the second memory unit 202.

FIGS. 3B and 3C are an equivalent circuit diagram and a layout diagram showing a layout of a configuration of a pixel 101d provided in the pixel unit 10 in the image sensor according to this embodiment. Note that this embodiment may be combined with either of the above-described embodiments, and in the case of being combined with the second embodiment, the pixel 101d is arranged at least in the imaging region 10b.

The pixel 101d includes a first photodiode PD1 and a second photodiode PD2, and the first and second photodiodes PD1 and PD2 share an on-chip microlens ML. It is assumed that the size of a photoelectric conversion region of each of the first and second photodiodes PD1 and PD2 is half the size of the photoelectric conversion region of the photodiode PD in FIG. 3A. Light from different regions (partial pupils) in the exit pupil are incident on the first photodiode PD1 and the second photodiode PD2, and the pixel 101d has a pupil division function. Accordingly, focus detection in a phase-difference detection method can be performed using an image A signal obtained from the output of the first photodiode PD1 and an image B signal obtained from the output of the second photodiode PD2 in the pixel within a focus detection area.

With the pixel 101d having this configuration, an imaging signal can be obtained by transferring charge from both the first and second photodiodes PD1 and PD2 to the floating diffusion FD and reading out a signal. Also, one focus detection signal can be obtained by transferring charge from one of the first and second photodiodes PD1 and PD2 to the floating diffusion FD and reading out a signal. In the case of reading out, as a focus detection signal, a signal that is based on the charge in the first photodiode PD1, the signal that is based on the charge in the second photodiode PD2 can be obtained by subtracting the focus detection signal from the imaging signal.

The imaging signal is a signal that is based on the charge in the two photodiodes, whereas the focus detection signal is a signal that is based on the charge in one photodiode, and therefore, the largest value of the focus detection signal is smaller than that of the imaging signal. Therefore, similar to the basis signal in the above-described embodiments, the focus detection signal can be held in the second memory unit 202 that includes a smaller number of bit memories than in the first memory unit 201.

A pixel signal is read out, in place of the basis signal, in a state where the charge in one of the first and second photodiodes PD1 and PD2 is accumulated, and the read pixel signal is held as the focus detection signal in the second memory unit 202. When the imaging signal is read out, the pixel signal is read out in a state where the charge in both the first and second photodiodes PD1 and PD2 is accumulated. Other circuit configuration and operation may be similar to those described in the first or second embodiment.

According to this embodiment, effects similar to those of the above-described embodiments can be achieved in the case where the image sensor has a pupil division function. Note that, although this embodiment has described the case where each pixel has two photoelectric conversion regions or photodiodes, each pixel may have three or more photoelectric conversion regions or photodiodes. In any case, the imaging signal is a pixel signal that is based on the charge accumulated in all of the plurality of photoelectric conversion regions, and the focus detection signal is a pixel signal that is based on the charge accumulated in some of the plurality of photoelectric conversion regions.

Other Embodiments

Note that the above embodiments have described an exemplary noise signal and focus detection signal as an example of pixel signals whose largest value is smaller than that of the imaging signal. However, the pixel signal whose largest value is smaller than that of the imaging signal may be other pixel signals, such as a pixel signal obtained from a low-sensitivity pixel for enlarging the D range. The present invention may be implemented in any configuration in which a pair of memory units are provided that hold any one pair of pixel signals having different largest values.

The above-described image sensor is applicable to an image capture apparatus having an image processing unit that performs image processing using a signal read out from a first memory unit and a signal read out from a second memory unit. In the case of holding the S signal in the first memory unit and the N signal in the second memory unit, the image processing unit can perform noise reduction processing for the S signal by obtaining a difference between the S signal and the N signal. In the case of holding the S signal in the first memory unit and one of the focus detection signals in the second memory unit, the image processing unit can perform focus detection processing after obtaining the other of the focus detection signals by obtaining a difference between the S signal and the one of the focus detection signals.

Embodiments of the present invention can also be realized by a computer of a system or apparatus that reads out and executes computer executable instructions (e.g., one or more programs) recorded on a storage medium (which may also be referred to more fully as a 'non-transitory computerreadable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-202913, filed on Oct. 14, 2015, which is hereby incorporated by reference herein in its entirety.

What is claimed is:

1. An image sensor having a plurality of pixels and capable of reading out pixel signals having different largest values, comprising:
   an A/D convertor that performs A/D conversion on a read pixel signal;
   a first memory that holds a first pixel signal obtained by performing the A/D conversion; and
   a second memory that holds a second pixel signal obtained by performing the A/D conversion,
   wherein the first memory and the second memory are respectively constituted by a plurality of bit memories,
   each of the first memory and the second memory has at least one bit memory that provides a redundant storage capacity and is used as an alternative to a bit memory that has failed, and
   the redundant storage capacity of the first memory is larger than the redundant storage capacity of the second memory.

2. The image sensor according to claim 1, wherein storage capacity excluding the redundant storage capacity is larger in the first memory than in the second memory.

3. The image sensor according to claim 1, wherein storage capacity excluding the redundant storage capacity is the same in the first memory and the second memory.

4. The image sensor according to claim 1, wherein the largest value of the second pixel signal is smaller than the largest value of the first pixel signal.

5. The image sensor according to claim 1, wherein each of the plurality of pixels has a plurality of photoelectric conversion areas, and
   the first pixel signal is a signal that is based on charge accumulated in all of the plurality of photoelectric conversion areas, and the second pixel signal is a signal that is based on charge accumulated in some of the plurality of photoelectric conversion areas.

6. The image sensor according to claim 1, wherein both the first memory and the second memory are provided for each column output line of the plurality of pixels.

7. The image sensor according to claim 1, wherein the plurality of pixels include pixels that are not exposed and pixels that are exposed, and
   the second memory is provided for each column output line of the pixels that are not exposed, and the first memory is provided for each column output line of the pixels that are exposed.

8. The image sensor according to claim 1, wherein the second pixel signal is a signal that corresponds to a noise component.

9. The image sensor according to claim 1, wherein, among the plurality of pixels, a pixel that outputs the second pixel signal is less sensitive than a pixel that outputs the first pixel signal.

10. The image sensor according to claim 1, further comprising:
    a selector for reading and writing a pixel signal obtained by performing the A/D conversion, using bit memories that have not failed in the plurality of bit memories.

11. The image sensor according to claim 10, wherein the selector is provided so as to be shared by all of the first memory and the second memory.

12. An image capture apparatus comprising:
    an image sensor having a plurality of pixels and capable of reading out pixel signals having different largest values, the image sensor including:
       an A/D convertor that performs A/D conversion on a read pixel signal;
       a first memory that holds a first pixel signal obtained by performing the A/D conversion; and
       a second memory that holds a second pixel signal obtained by performing the A/D conversion,
       wherein the first memory and the second memory are respectively constituted by a plurality of bit memories,
       each of the first memory and the second memory has at least one bit memory that provides a redundant storage capacity and is used as an alternative to a bit memory that has failed, and
       redundant storage capacity of the first memory is larger than redundant storage capacity of the second memory; and
    an image processor that performs image processing using the first pixel signal that is read out from the first memory and the second pixel signal that is read out from the second memory.

13. The image capture apparatus according to claim 12, wherein the image processing is noise reduction processing for obtaining a difference between the first pixel signal that is read out from the first memory and the second pixel signal that is read out from the second memory.

14. The image capture apparatus according to claim 12, wherein the image processing is focus detection processing using the second pixel signal that is read out from the second memory and a difference between the first pixel signal that is read out from the first memory and the second pixel signal that is read out from the second memory.

15. An image sensor having a plurality of pixels and capable of reading out pixel signals having different largest values, comprising:
    an A/D convertor that performs A/D conversion on a read pixel signal; and a memory that holds a pixel signal obtained by performing the A/D conversion,
wherein the memory includes a first memory for holding a first pixel signal of the pixel signals, and a second memory for holding a second pixel signal of the pixel signals,
redundant storage capacity of the first memory is larger than redundant storage capacity of the second memory, and
storage capacity excluding the redundant storage capacity is larger in the first memory than in the second memory.

16. An image sensor having a plurality of pixels and capable of reading out pixel signals having different largest values, comprising:
an A/D convertor that performs A/D conversion on a read pixel signal; and
a memory that holds a pixel signal obtained by performing the A/D conversion,
wherein the memory includes a first memory for holding a first pixel signal of the pixel signals, and a second memory for holding a second pixel signal of the pixel signals,
redundant storage capacity of the first memory is larger than redundant storage capacity of the second memory, and
storage capacity excluding the redundant storage capacity is the same in the first memory and the second memory.

17. An image sensor having a plurality of pixels and capable of reading out pixel signals having different largest values, comprising:
an A/D convertor that performs A/D conversion on a read pixel signal; and
a memory that holds a pixel signal obtained by performing the A/D conversion,
wherein the memory includes a first memory for holding a first pixel signal of the pixel signals, and a second memory for holding a second pixel signal of the pixel signals,
redundant storage capacity of the first memory is larger than redundant storage capacity of the second memory, and
the largest value of the second pixel signal is smaller than the largest value of the first pixel signal.

18. An image sensor having a plurality of pixels and capable of reading out pixel signals having different largest values, comprising:
an A/D convertor that performs A/D conversion on a read pixel signal; and
a memory that holds a pixel signal obtained by performing the A/D conversion,
wherein the memory includes a first memory for holding a first pixel signal of the pixel signals, and a second memory for holding a second pixel signal of the pixel signals,
redundant storage capacity of the first memory is larger than redundant storage capacity of the second memory,
the plurality of pixels include pixels that are not exposed and pixels that are exposed, and
the second memory is provided for each column output line of the pixels that are not exposed, and the first memory is provided for each column output line of the pixels that are exposed.

19. An image sensor having a plurality of pixels and capable of reading out pixel signals having different largest values, comprising:
an A/D convertor that performs A/D conversion on a read pixel signal; and a memory that holds a pixel signal obtained by performing the A/D conversion,
wherein the memory includes a first memory for holding a first pixel signal of the pixel signals, and a second memory for holding a second pixel signal of the pixel signals,
redundant storage capacity of the first memory is larger than redundant storage capacity of the second memory, and
the second pixel signal is a signal that corresponds to a noise component.

20. An image sensor having a plurality of pixels and capable of reading out pixel signals having different largest values, comprising:
an A/D convertor that performs A/D conversion on a read pixel signal; and
a memory that holds a pixel signal obtained by performing the A/D conversion,
wherein the memory includes a first memory for holding a first pixel signal of the pixel signals, and a second memory for holding a second pixel signal of the pixel signals,
redundant storage capacity of the first memory is larger than redundant storage capacity of the second memory, and
among the plurality of pixels, a pixel that outputs the second pixel signal is less sensitive than a pixel that outputs the first pixel signal.

21. An image capture apparatus comprising:
an image sensor having a plurality of pixels and capable of reading out pixel signals having different largest values, the image sensor including:
an A/D convertor that performs A/D conversion on a read pixel signal; and
a memory that holds a pixel signal obtained by performing the A/D conversion,
wherein the memory includes a first memory for holding a first pixel signal of the pixel signals, and a second memory for holding a second pixel signal of the pixel signals, and
redundant storage capacity of the first memory is larger than redundant storage capacity of the second memory; and
an image processing unit adapted to perform image processing using the first pixel signal that is read out from the first memory and the second pixel signal that is read out from the second memory,
wherein the image processing is noise reduction processing for obtaining a difference between the first pixel signal that is read out from the first memory and the second pixel signal that is read out from the second memory.

22. An image capture apparatus comprising:
an image sensor having a plurality of pixels and capable of reading out pixel signals having different largest values, the image sensor including:
an A/D convertor that performs A/D conversion on a read pixel signal; and
a memory that holds a pixel signal obtained by performing the A/D conversion,
wherein the memory includes a first memory for holding a first pixel signal of the pixel signals, and a second memory for holding a second pixel signal of the pixel signals, and
redundant storage capacity of the first memory is larger than redundant storage capacity of the second memory; and an image processing unit adapted to perform image processing using the first pixel signal that is read out from the first memory and the second pixel signal that is read out from the second memory,
wherein the image processing is focus detection processing using the second pixel signal that is read out from the second memory and a difference between the first pixel signal that is read out from the first memory and the second pixel signal that is read out from the second memory.

* * * * *